Jan. 29, 1974　　　S. ZAROMB　　　3,788,899
ELECTROCHEMICAL POWER GENERATION APPARATUS AND METHODS
Filed Dec. 24, 1970　　　　　　　　　　　4 Sheets-Sheet 3

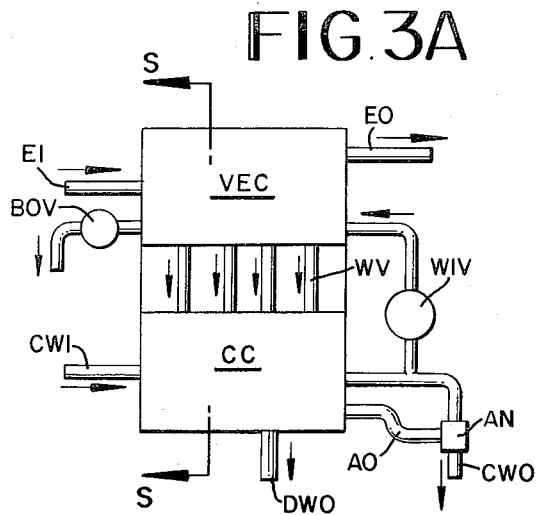
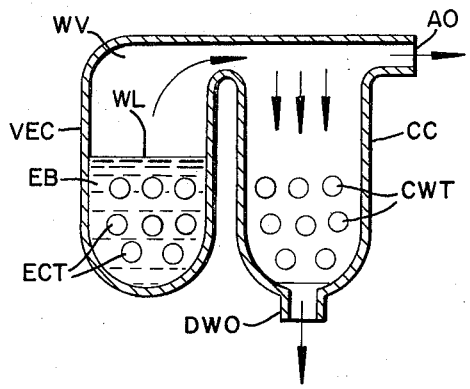
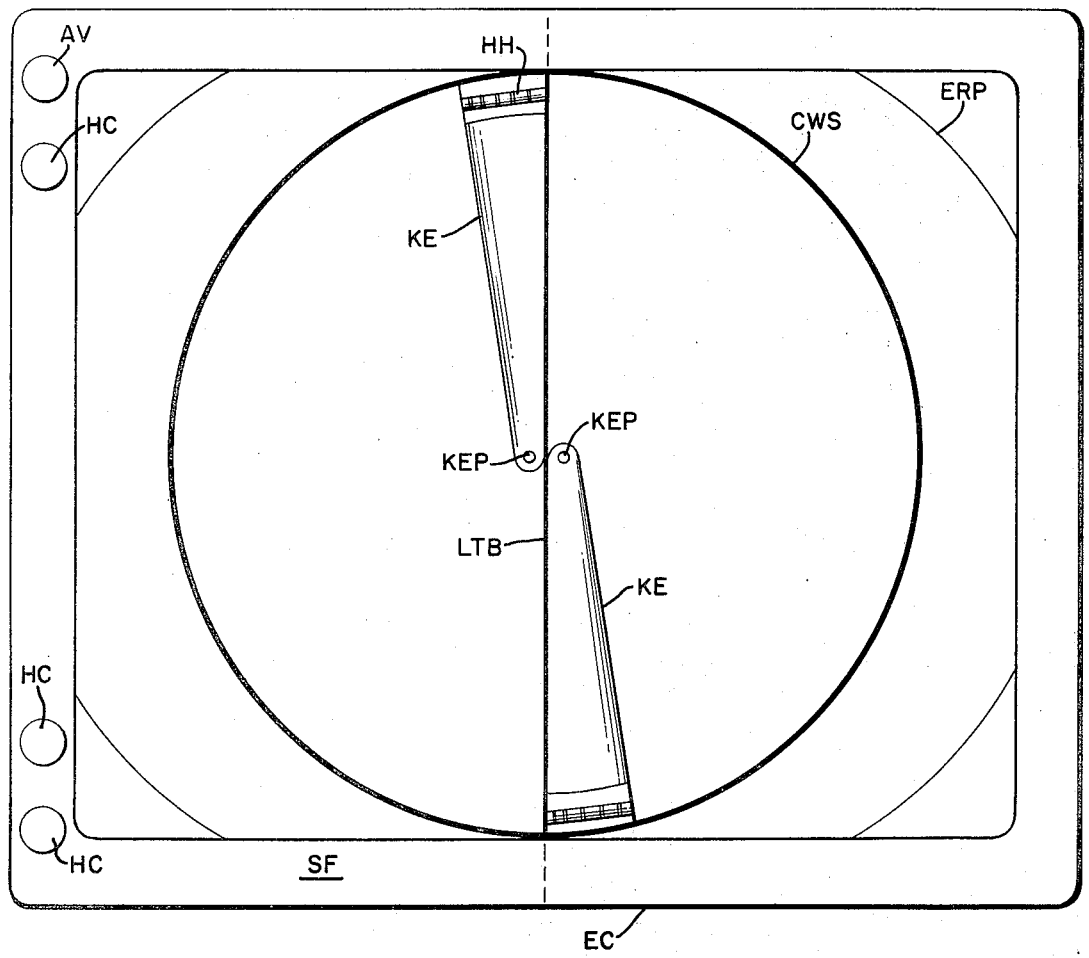

United States Patent Office 3,788,899
Patented Jan. 29, 1974

3,788,899
ELECTROCHEMICAL POWER GENERATION APPARATUS AND METHODS
Solomon Zaromb, 376 Monroe St., Passaic, N.J. 07055
Continuation-in-part of application Ser. No. 633,348, Apr. 12, 1967, now Patent No. 3,554,810, and a continuation-in-part of abandoned application Ser. No. 5,340, Mar. 16, 1970. This application Dec. 24, 1970, Ser. No. 101,284
The portion of the term of the patent subsequent to Jan. 12, 1988, has been disclaimed
Int. Cl. H01m 27/12, 29/04
U.S. Cl. 136—86 A    18 Claims

ABSTRACT OF THE DISCLOSURE

A power source comprises an electrochemical battery cell including an anode and an oxygen or hydrogen peroxide depolarized cathode, a liquid electrolyte solution, electrolyte circulation means, an electrolyte container, and means to produce changes in the volumes of electrolyte in said container and in said battery cell and thereby control the current density at the surfaces of said anode and cathode. The anode may be of a consumable metal type, especially of aluminum. The volume changes may be effected by expanding or collapsing a reversibly expansible pocket in said electrolyte container. When several battery cells are connected in series, electrical current leakage paths through the electrolyte circulation means are blocked by a system of valves which sequentially and intermittently connect one of said cells at a time to said circulation means. Heat exchange apparatus may be included comprising a vacuum distillation means whereby impure water is converted into distilled water, preferably by utilizing the heat generated in said power source.

---

This invention relates to improvements in methods and apparatus for electrochemical power generation, especially those utilizing consumable metals such as zinc and aluminum.

This is a continuation-in-part of my applications. Ser. No. 633,348, filed Apr. 12, 1967, now U.S. Pat. No. 3,554,810, and Ser. No. 5,340, filed Mar. 16, 1970, now abandoned, In said co-pending applications, I have disclosed apparatus and methods for insuring satisfactory operation of metal-air batteries, especially aluminum-air batteries.

It is the purpose of this invention to further improve the characteristics and performance of such batteries and related fuel cells.

It is a further object of this invention to greatly increase the overall energy to weight ratio of the above-mentioned metal-air batteries in those applications where there is an abundant water supply, e.g., in marine vehicles or in areas which may be remote from an electric power line but near a water source.

Briefly, my invention consists of a metal-air battery assembly, wherein consumable metal anodes are electrochemically oxidized to a metal hydroxide thereby providing electrical energy, the rate of this process being automatically regulated by electrical circuitry or a servo-mechanism which adjusts the electrolyte level and the electrolyte temperature within said battery assembly. The heat generated within the battery is carried away to a water-cooled heat-exchanger by the battery electrolyte, and the heat removed from said electrolyte may be used to generate pure water by a vacuum-distillation process, thereby drastically reducing the overall weight requirements of the power source.

Another feature of my invention, which may also apply to other electrochemical power sources utilizing a circulating electrolyte, e.g., to hydrazine fuel cells, is to have the electrolyte flow intermittently through one battery cell at a time, the flow through each cell being effected sequentially by an appropriate system of valves. This feature eliminates electrical current leakage paths in a pile of series-connected cells, while providing adequate electrolyte circulation through each cell.

My invention is best explained with reference to the drawing, in which:

FIG. 3A is a diagrammatic representation of the heat exchange apparatus HE of FIG. 2 applicable to one particular embodiment of my invention;

FIG. 3B is a diagrammatic view of section S—S of FIG. 3A;

FIG. 4 is a diagrammatic top view of the electrolyte and precipitate container EC of FIGS. 1 and 2;

Figure 1:
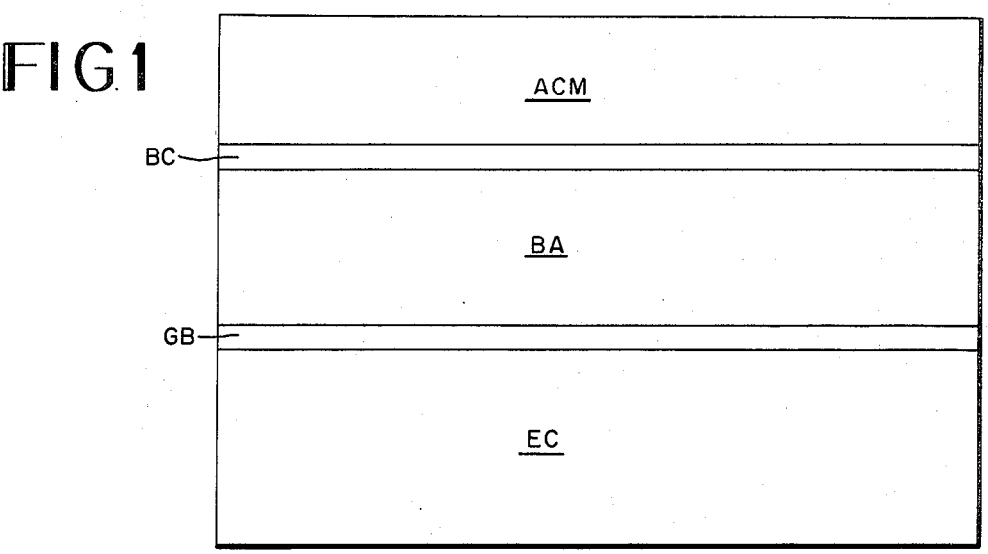
FIG. 1 is a block diagram showing the major components in one embodiment of my invention.
Figure 2:
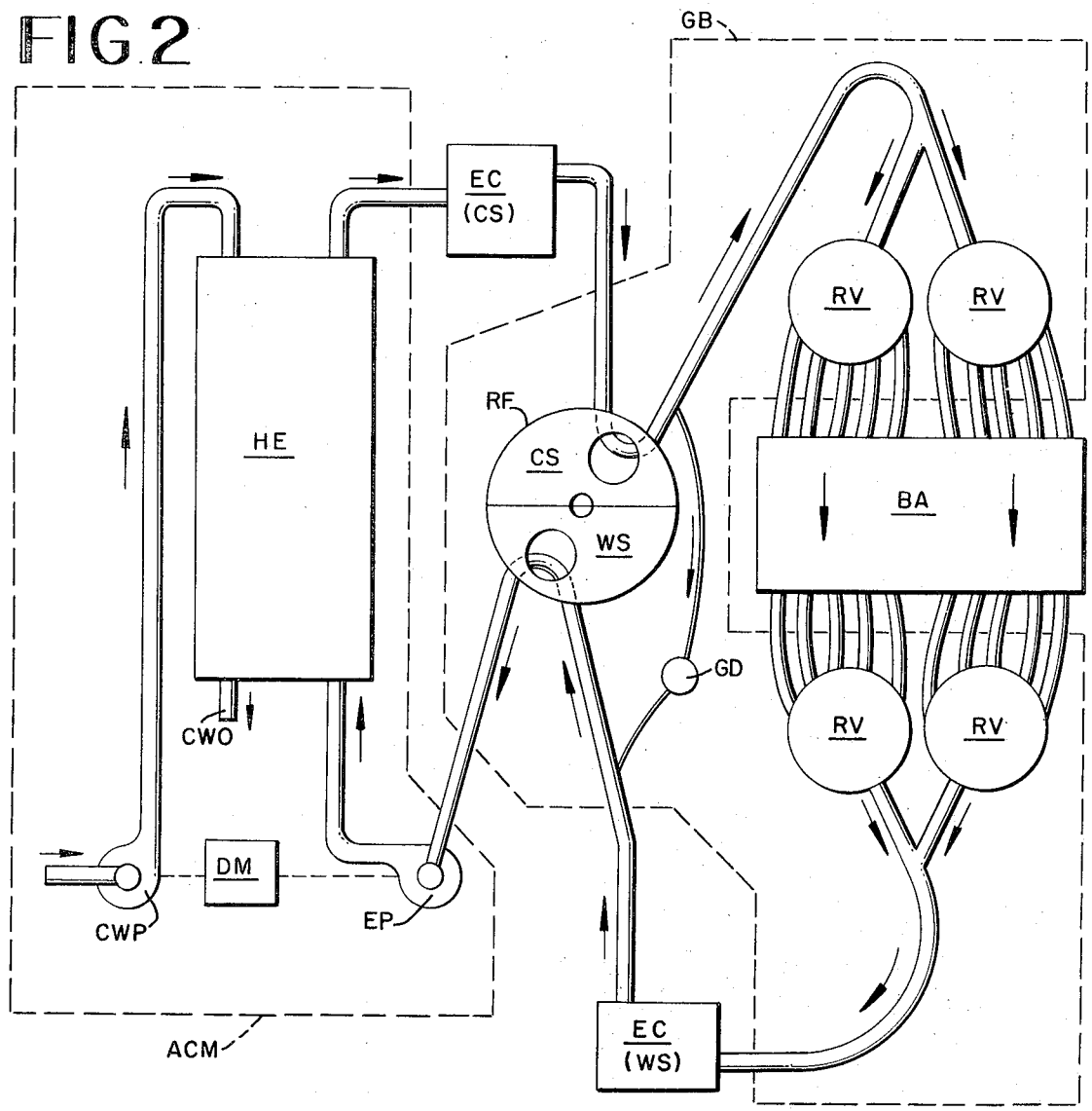
FIG. 2 is a flow diagram of the electrolyte circulation system.
Figure 5A:
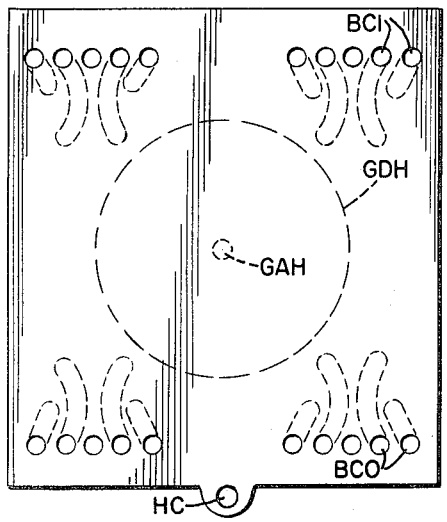
Figure 5B:
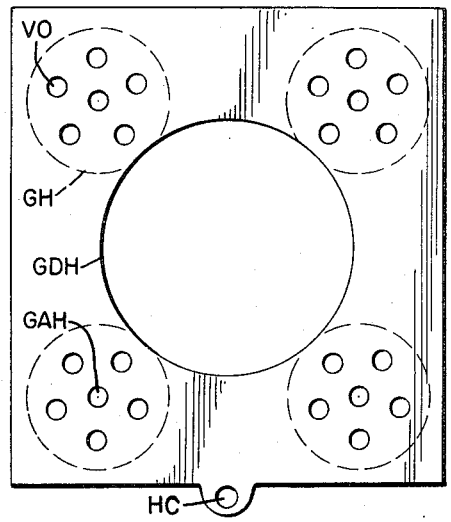
Figure 5C:
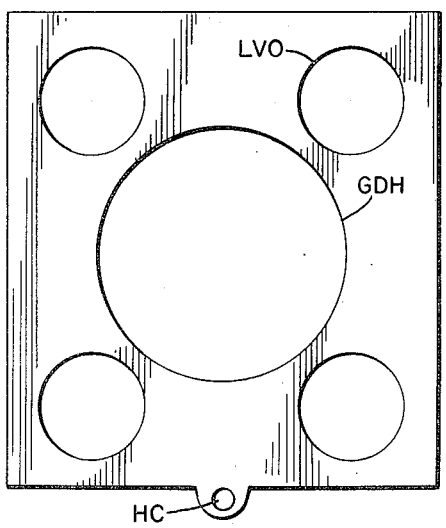
Figure 5D:
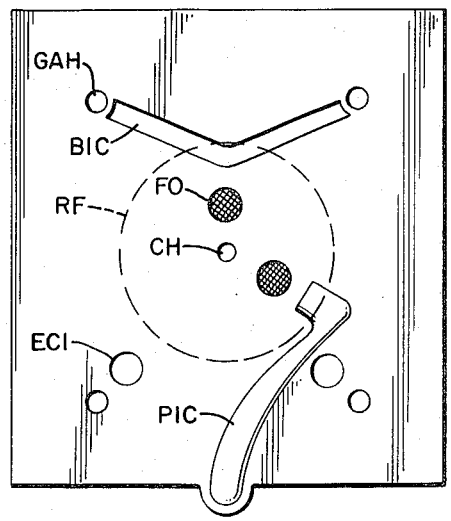

FIG. 5 consists of diagrammatic top views of each of four super-imposed plates which make up the gear box GB of FIGS. 1 and 2 and of some of the gears contained in GB; and specifically FIG. 5A is a diagrammatic top view of the uppermost plate of GB;

FIG. 5B is a diagrammatic top view of the upper middle plate of GB;

FIG. 5C is a diagrammatic top view of the lower middle plate of GB;

FIG. 5D is a diagrammatic top view of the bottom plate of GB; and

Figure 5E:
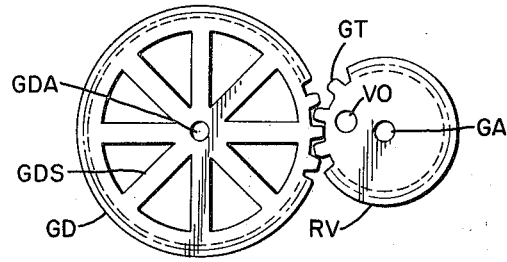
Figure 6:
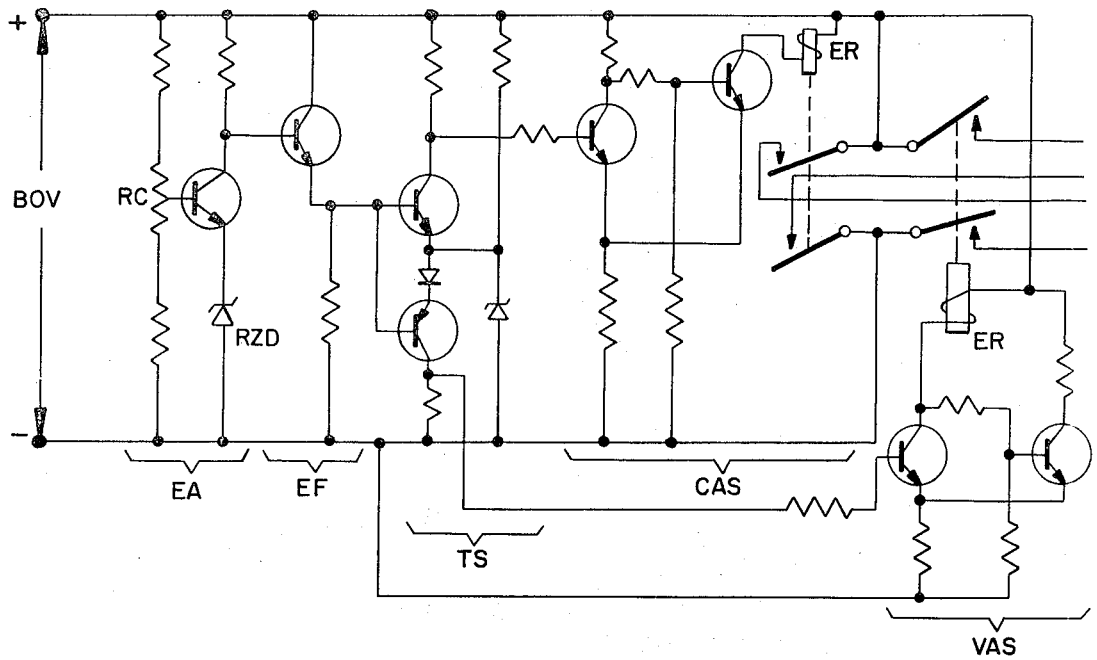
Figure 7:
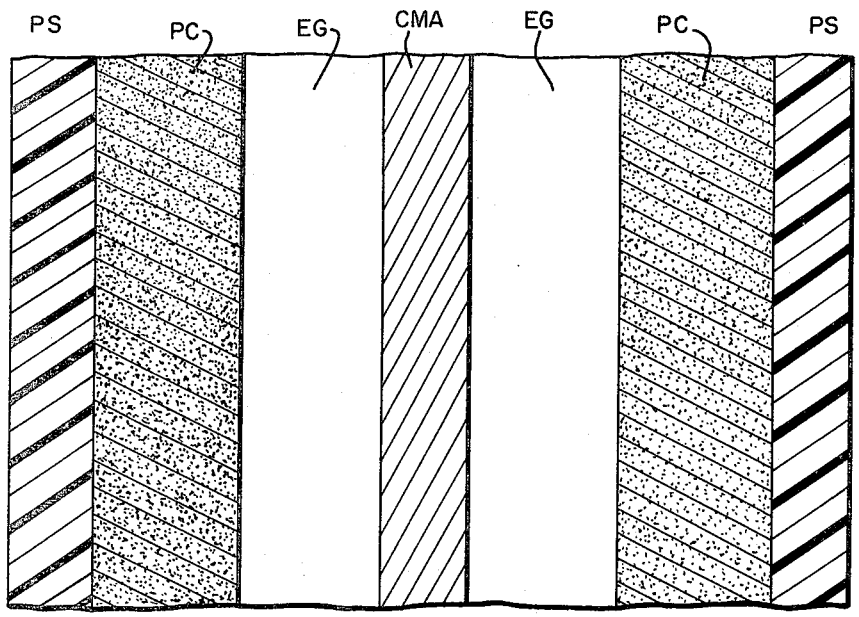

FIG. 5E is a partial diagrammatic top view of the gear drive GB of one of the rotary valves RV contained in GB;

FIG. 6 is a circuit diagram of a voltage control circuit applicable to a particular embodiment of my invention; and FIG. 7 is a partial diagrammatic cross-sectional view of an electrochemical cell used in some embodiments of my invention.

In FIG. 1 are shown the major components of a metal-air power source comprising:

(1) A battery assembly BA, consisting of a number of electrochemical cells, each cell, as shown in FIG. 7, comprising a consumable metal anode CMA, e.g., a zinc or aluminum anode, between two oxygen- or air-depolarized porous cathodes PC, the anodes and cathodes being separated by electrolyte gaps EG, and plastic separators PS providing electrical insulation between the cathodes of adjacent series-connected cells.

(2) A gear box GB supporting BA and in turn resting on an electrolyte container EC, said gear box comprising inlet and outlet channels leading to and from each of said electrochemical cells, said channels abutting against rotary valves RV which are moved by a gear drive GD (cf. FIGS. 2 and 5) which is in turn actuated by the pumped electrolyte.

(3) An electrolyte container EC supporting GB and also serving as a collector of any precipitate, e.g., of $Al(OH)_3$ or $Zn(OH)_2$, generated by the electrochemical oxidation of said consumable metal anode CMA.

(4) A battery cover BC serving to prevent loss of electrolyte from BA, said cover comprising an air-permeable electrolyte-impervious porous polyfluoroethylene membrane, and possibly also a platinum catalyst promoting oxidation of any hydrogen which may escape from BA under poor operating conditions.

(5) An auxiliary components module ACM supported by BC and comprising the heat exchange apparatus HE of FIGS. 2 and 3, an electrolyte pump EP and a cooling water pump CWP both driven by the same duplex motor DM (cf. of FIG. 2), an air blower (not shown) supplying air to BA, and several additional components, as discussed below.

The main functional interrelationships between ACM, BA, GB, and EC are explained by the flow diagram of FIG. 2. With the consumable anodes consisting of aluminum, and the battery operating at full power, the heat generated in BA may cause the electrolyte temperature in each cell to rise at a rate of about 0.1° C./second in the absence of fluid flow. Part of this electrolyte is intermittently replaced by cooler electrolyte at regular intervals when the synchronized rotary valves RV at the inlet and outlet sides of the battery cells are connecting a particular cell to the rest of the electrolyte flow system. The electrolyte leaving a cell is first passed through the suction side or warm section (WS) of EC and then through a rotary filter RF which removes any $(Al(OH)_3)$ particles which may have precipitated out of the electrolyte, and the clear liquid is forced by the electrolyte pump EP through the heat exchange apparatus HE. A cooling water pump CWP driven together with EP by the same duplex motor DM maintains the flow of cooling water through HE. To prevent fouling of the heat transfer surfaces in HE the cooling water should also be preferably prefiltered.

The $Al(OH)_3$ precipitate retained by RF is scraped off by stationary blades (not shown) which press against the lower surface of RF, and the scraped precipitate is allowed to settle down to the bottom of EC. The latter together with RF is split in two separate sections. The cooled electrolyte from HE is forced into the cool section (CS) of EC through $Al(OH)_3$ seeds. This results in the precipitation of any supersaturated $Al(OH)_3$ out of the electrolyte, thereby minimizing the degree of supersaturation in the rest of the system. The precipitate formed in the cool section of EC is again retained by RF, while the clear cool electrolyte is allowed to pass through a rotary valve RV back into one of the battery cells.

The series-connected battery cells are subdivided into two sets of adjoining cells. The flow through each set is controlled by a pair of rotary valves RV which consist of flat horizontal polyfluoroethylene gears (FIG. 5E). Each gear is perforated by a valve opening VO whose center is at a radius $r$ from the gear axis. A polyfluoroethylene plate above the rotating gear has similar symmetrically disposed valve openings VO at the same radius $r$ from the gear axis, each hole leading via a separate channel to one of the battery cells. The two gears controlling the outlets from all cells are so synchronized that when the opening in one gear is aligned with one of the outlet openings, the opening in the other gear is between nearest outlet openings. This ensures that only one outlet at a time is connected to the rest of the circulating system. The same applies to the inlet valves. The latter are so synchronized with the outlet valves that the inlet and outlet of each battery cell are opened and closed simultaneously.

Part of the pumped electrolyte is channeled through a gear drive GD which actuates the rotation of RV and RF. In fact, GD may be an integral part of RF as shown below. When the valves are in intermediate positions which block the flow of electrolyte through all the cells, the rate of flow through GD increases, which accelerates the rotation of the gears until the valves are again in an open position.

As indicated by the dashed lines of FIG. 2, the valves RV and the filter RF are part of a gear box GB which comprises four polyfluoroethylene plates clamped together tightly by plastic screws distributed around the rim and throughout the body of the plates. For the sake of clarity, said screws and screw holes are not included in the top view drawings of these plates, FIGS. 5A–5D. In the uppermost plate, FIG. 5A, are shown in alignment ten battery cell inlets BCI, and ten battery cell outlet BCO, each inlet and outlet consisting of a hole connected on the underside of the uppermost plate by means of a channel to an opening which is superposed over one of the circularly disposed openings VO shown in the upper middle plate, FIG. 5B. On the underside of the latter plate are circular depressions GH housing polyfluoroethylene gears. At the center of each depression is a small hole for the gear axis GAH. Each gear RV has a small opening VO which opens successively to each of the circularly disposed openings VO of FIG. 5B as the gear rotates. The opening leads to a larger valve opening LVO in the lower middle plate, FIG. 5C, and from there either to a battery inlet channel BIC or to an electrolyte container inlet ECI in the bottom plate, FIG. 5D. The latter inlet leads into the electrolyte container EC, while channel BIC provides an outlet for electrolyte entering from EC through one of the filter openings FO into the space between the spokes GDS of the gear drive GD (FIG. 5E) which is contained in the central gear drive housing GDH.

The pressure difference between the two filter openings FO provides the driving force for the rotation of GD in a properly designed system. Alternately GD may be actuated by an auxiliary motor (not shown).

To the lower of the two axles GDA of GD passing through the central hole CH of FIG. 5D is affixed a disk-shaped rotary filter RF underneath the bottom plate. As RF rotates with GD, it is freed of precipitate by the knife blades pressing against its lower surface, thus providing a clean filter surface for the electrolyte entering from EC through the filter openings FO of FIG. 5D into the openings between the spokes GDS. A pump inlet channel PIC in the lower right-hand side of FIG. 5D connects the warm side of EC (through the filter and the gear drive openings) to the electrolyte pump EP, in accordance with the flow diagram of FIG. 2. The hose connection HC to EP is indicated at the lower edges of FIGS. 5A–5C.

From EP the electrolyte is first forced through the heat exchange apparatus HE which may be either a conventional air- or water-cooled heat exchanger or else the apparatus shown in FIG. 3. The latter provides pure water to the power source during battery operation, thereby reducing the total weight and volume of materials which need to be transported in order to ensure satisfactory operation of the power source in areas which may be remote from a distilled water supply while near an abundant source of impure water. In such applications, the apparatus HE of FIG. 2 may include the components shown in the flow diagram of FIG. 3A, which comprises a vacuum evaporation chamber VEC interconnected with a condensation chamber CC. An aspirator nozzle AN at the cooling water outlet CWO removes air and other noncondensable gases from both chambers through an air outlet AO, and generates a vacuum such that the pressure in each chamber approaches the vapor pressure of the water exiting through CWO. Part of the cooling water leaving CC may be allowed to enter VEC through the water inlet valve WIV until the water level WL in VEC is above the electrolyte cooling tubes ECT, as indicated in FIG. 3B. The warm electrolyte from the pump EP enters into tubes ECT via an electrolyte inlet EI, and the cooled electrolyte exits through the electrolyte outlet EO into the electrolyte container EC. The heat passed through ECT causes vacuum evaporation of water from the evaporating brine EB adjacent to ECT, and the water vapor WV escaping into CC carries away its heat of vaporization from VEC and hence from ECT. Condensation of WV at the cooling water tubes CWT results from the transfer of heat of vaporization from WV to the cooling water. The condensed water dripping down from the surfaces of CWT is then collected at the bottom of CC and withdrawn through a distilled water outlet DWO.

As WL drops below the uppermost tubes ECT, additional water is allowed to enter VEC through WIV. To prevent, the impurities in EB from reaching an excessive concentration, the brine formed in VEC may be occasionally flushed out through a brine outlet valve BOV. The valves WIV and BOV may be automatically actuated by signals from a liquid level sensor and/or a liquid density (or liquid conductivity) sensor.

A major advantage of aluminum-air batteries over other metal-air batteries is their high energy to weight ratio, even when all the required water has to be carried along with the power source. Since water is the major reactant consumed in the aluminum-air battery reaction, the oxidation of aluminum to aluminum hydroxide, and the actual weight of water required in a practical battery is known to be at least four times the weight of the aluminum consumed in the battery reaction, the afore-described vacuum-distillation apparatus of FIG. 3 renders the energy to weight ratio even more favorable. Furthermore, at least part of the aluminum required for the battery reaction could be obtained from aluminum containers which might be used in lieu of other packaging materials for the transportation of food and other supplies.

As indicated by dashed lines in FIG. 2, the pumps EP and CWP together with DM and HE are all contained in the auxiliary components module ACM. In addition, ACM may include provisions to activate the battery and to maintain its desired operating specifications, especially the voltage output, under various ambient temperature conditions. To activate the battery, electrolyte may be forced into BA by manually compressing a collapsible auxiliary electrolyte reservoir (not shown) forming part of ACM. Once power is delivered by the battery, an air blower in ACM forces air through the cathodes in BA, and the electronic circuit of FIG. 6 actuates a small air compressor (not shown) which blows up the expansible rubber pocket ERP contained in EC (cf. FIG. 4) thereby forcing electrolyte from EC into BA until a sufficient electrolyte level is reached in BA to yield either a preset output voltage or the maximum feasible value, whichever is lower.

The circuit of FIG. 6 comprises an error amplifier EA, an emitter follower EF, a threshold separator TS, a compressor actuating switch CAS, and a valve actuating switch VAS. The battery output voltage BOV is determined by a reference Zener diode RZD and an adjustable rheostat control RC which permits adjustment of the desired voltage setting. Depending on whether BOV is lower or higher than the preset voltage one of the two electrical relays ER will actuate CAS or VAS, thereby expanding or collapsing the air pockets ERP in EC, which in turn results in an increase or reduction of the electrolyte volume in BA. For a given load or electrical current drain from the battery, the current density at the anodes and cathodes in each battery cell varies approximately in inverse proportion to the volume of electrolyte in BA, and the output voltage of each cell increases as the current density decreases. Hence the foregoing changes in electrolyte volume result in an increase or decrease in BOV.

Although a pneumatic means is used here to effect expansion or collapse of ERP, it is evident that such expansion or collapse can be effected by other means, e.g., by spring action, lever action, or by an electrical solenoid causing reversible displacements of an outer surface of each expansible pocket. Neither need the pockets be made of rubber or of other stretchable material. For instance, they can be made of accordion-shaped or otherwise pleated polyethylene, polyfluoroethylene, or similar material. Similarly the circuit of FIG. 6 can be replaced by a variety of well-known servo-mechanisms.

The electrolyte temperature in BA is also controlled by an electrical circuit or other servo-mechanism (not shown). If the initial output voltage is lower than a preset minimum value, the pumps remain inactive until the temperature reaches a maximum preset value, as measured by a temperature sensor (not shown). Once the preset temperature maximum has been reached, the pumps are actuated, and keep working until the temperature drops below a preset minimum value.

The foregoing design features provide for the activation and automatic regulation of an aluminum-air battery system. I next explain the procedure used in removing the $Al(OH)_3$-electrolyte mixture, and in replacing it with a fresh charge of electrolyte.

The design of EC is shown schematically in FIG. 4. A vertical liquid-tight barrier LTB through the middle of EC separates the above-mentioned cool and warm sections CS and WS. Two or more cylindrical wall segments CWS confine the precipitate to an inner cylindrical space in EC. The electrolyte originally occupying most of the container volume becomes also chiefly confined to the inner cylinder as the rubber pockets ERP at the four corners of EC are expanded by an air compressor upon activation of the battery. The hose connection HC to said air compressor and also an air valve AV are in the upper left-hand corner of FIG. 4.

The upper rim of EC is partly covered by a sealing flange SF which is clamped against the gear box GB prior to introduction of electrolyte. The latter is then introduced into EC (and into the rest of the circulating system, excluding the battery assembly BA) via the two hose connections HC (leading to HE) indicated at the lower left-hand corner of FIG. 4. To activate the battery, the electrolyte forced out of the four corners of EC is channeled into BA via RV (cf. FIGS. 2 and 5). Upon continued battery operation an $Al(OH)_3$ precipitate gradually builds up at the bottom of the inner cylinder.

Upon battery shut-off, the air in the rubber pockets is allowed to escape through the air valve AV, the pressure of the electrolyte above EC causes the pockets ERP to collapse, and the electrolyte drains out of BA into EC. The hose connections HC between EC and HE, between EC and the air compressor, and between EC and EP are then broken (preferably by means of quick-disconnect couplings), and EC is disengaged from the gear box GB. Most of the contents of EC are discarded by first decanting the electrolyte and then fully inverting the container. To dislodge the precipitate cake which may be firmly adhering to the container walls, two L-shaped knife edges KE are provided. These are pressing against the bottom surface and against the wall segments CWS, and are retained by pins KEP which permit KE to swing through 180°. Near the top of each knife edge is a hinged handle HH which can be swung outside of the container. The precipitate cake can thus be dislodged by stepping on the outswung handles so as to keep KE fixed while giving the inverted container a 180° turn.

The emptied container is then ready to be filled with fresh electrolyte. It is neither necessary nor desirable to clean out the residual precipitate, as the latter is needed to provide the seeds for the precipitation of $Al(OH)_3$ out of the electrolyte during the next operational cycle.

While the afore-described embodiment offers special advantages for some applications, my invention obviously applies to other metal-air batteries. For instance, the consumable metal anodes could be made of zinc in lieu of aluminum in some embodiments of my invention. Neither is this invention confined to metal-air or metal-oxygen batteries. In submarine applications, where the air supply is limited, it may be preferable to use hydrogen peroxide in lieu of oxygen as the cathode depolarizer. The porous cathodes PC of FIG. 7 are then impregnated with an $H_2O_2$-rich electrolyte solution rather than with the usual air or oxygen depolarizer, and said $H_2O_2$-rich solution could be made to circulate longitudinally through PC or between PS within the battery assembly BA, and through a separate circulation and $H_2O_2$-supply system outside of BA. A rotary valve system similar to that of FIG. 5 can then again be used in the $H_2O_2$-rich circulation system to prevent the current leakage paths between series-connected cells.

There will now be obvious to those skilled in the art many modifications and variations of the afore-described apparatus and methods, which, however, will not depart from the scope of my invention if outlined by the following claims:

1. Power source comprising: an electrochemical battery cell including an anode and a cathode, a liquid electrolyte solution, electrolyte circulation means, a rigid electrolyte container and a control means produce changes in the volumes of electrolyte in said container and in said battery cell and thereby to control the current density at the surfaces of said anode and cathode, said control means comprising a reversibly expansible pocket within said container.

2. Power source as claimed in claim 1 wherein said cathode is oxygen-depolarized.

3. Power source as claimed in claim 1 wherein said cathode is depolarized by hydrogen peroxide.

4. Power source as claimed in claim 1 wherein said anode is a consumable metal.

5. Power source as claimed in claim 4 wherein said metal comprises aluminum.

6. Power source as claimed in claim 4 comprising a precipitate collection means and means for emptying said electrolyte container and said precipitate collection means.

7. Power source as claimed in claim 1 wherein said reversibly expansible pocket is air-filled.

8. Power source as claimed in claim 1 comprising a number of series-connected electrochemical cells, and means for blocking any current leakage paths between said cells through said electrolyte circulation means.

9. Power source as claimed in claim 1 wherein said means for blocking current leakage paths comprises a system of valves which sequentially and intermittently connect one of said cells at a time to said electrolyte circulation means.

10. Power source as claimed in claim 1 comprising heat exchange apparatus, said apparatus comprising a vacuum distillation means whereby impure water is converted into distilled water.

11. Power source as claimed in claim 10 wherein said heat exchange apparatus utilizes as heat generated in said power source.

12. Power source as claimed in claim 6 wherein said precipitate collection means is in the form of a round enclosure and comprises rotatable blades at the walls of said enclosure for dislodging any precipitate cake which may adhere to said walls.

13. Power source as claimed in claim 1 comprising means for adjusting the temperature of said electrolyte.

14. Power source as claimed in claim 1 wherein said means to produce volume changes is automatically actuated by a feedback mechanism.

15. Power source as claimed in claim 1 wherein said means to produce volume changes is pneumatic.

16. Power source as claimed in claim 1 comprising a rotary filter for retaining solid particles precipitating from said electrolyte solution.

17. Power source as claimed in claim 9 wherein said system of valves comprises a rotary valve.

18. Power source as claimed in claim 17 wherein said rotary valve is set in motion by the circulating electrolyte.

References Cited

UNITED STATES PATENTS

| | | | |
|---|---|---|---|
| 2,706,213 | 4/1955 | Lucas | 136—160.2 |
| 2,921,111 | 1/1960 | Crowley et al. | 136—160 |
| 3,524,769 | 8/1970 | Sturm et al. | 136—160 |
| 3,554,810 | 1/1971 | Zaromb | 136—160 |

ALLEN B. CURTIS, Primary Examiner

H. A. FEELEY, Assistant Examiner

U.S. Cl. X.R.

136—160